(12) United States Patent
Shani et al.

(10) Patent No.: US 9,703,687 B2
(45) Date of Patent: Jul. 11, 2017

(54) MONITOR USABLE WITH CONTINUOUS DEPLOYMENT

(71) Applicant: HEWLETT-PACKARD DEVELOPMENT COMPANY, L.P., Houston, TX (US)

(72) Inventors: Inbar Shani, Kibutz Beit Kama (IL); Amichai Nitsan, Rehovot (IL); Eli Mordechai, Modiin (IL)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/428,686

(22) PCT Filed: Sep. 21, 2012

(86) PCT No.: PCT/US2012/056596
§ 371 (c)(1),
(2) Date: Mar. 17, 2015

(87) PCT Pub. No.: WO2014/046672
PCT Pub. Date: Mar. 27, 2014

(65) Prior Publication Data
US 2016/0034380 A1    Feb. 4, 2016

(51) Int. Cl.
*G06F 11/36*    (2006.01)
*G06F 11/34*    (2006.01)
*G06F 9/445*    (2006.01)

(52) U.S. Cl.
CPC ............ *G06F 11/3672* (2013.01); *G06F 8/65* (2013.01); *G06F 11/3466* (2013.01);
(Continued)

(58) Field of Classification Search
None
See application file for complete search history.

(56) References Cited

U.S. PATENT DOCUMENTS

| 5,313,616 A | 5/1994 | Cline et al. |
| 7,016,807 B2 | 3/2006 | Morimoto et al. |

(Continued)

FOREIGN PATENT DOCUMENTS

| CN | 101484881 | 7/2009 |
| KR | 20080095528 | 10/2008 |

(Continued)

OTHER PUBLICATIONS

Mariani et al. "A technique for verifying component-based software." Electronic Notes in Theoretical Computer Science 116, Jan. 19, 2005: pp. 17-30.*

(Continued)

*Primary Examiner* — Chameli Das
*Assistant Examiner* — Joanne Macasiano
(74) *Attorney, Agent, or Firm* — Mannava & Kang, P.C.

(57) ABSTRACT

A monitor that monitors an application is provided herein. The monitor provides a monitor function that monitors an application. The monitor embeds the monitor function in meta data of a code base of the application. The monitor function embedded in the code base is activated. The monitor function is used to monitor data associated therewith during deployment of the application.

16 Claims, 6 Drawing Sheets

(52) U.S. Cl.
CPC ...... *G06F 11/3604* (2013.01); *G06F 11/3636* (2013.01); *G06F 11/3644* (2013.01); *G06F 2201/865* (2013.01)

(56) References Cited

U.S. PATENT DOCUMENTS

| | | | |
|---|---|---|---|
| 7,962,646 | B2 | 6/2011 | Ginis et al. |
| 2002/0066080 | A1* | 5/2002 | O'Dowd ............. G06F 11/3644 717/128 |
| 2002/0120922 | A1* | 8/2002 | Williams ................. G06F 8/43 717/143 |
| 2003/0204374 | A1* | 10/2003 | Madsen ............. G06F 11/3466 702/186 |
| 2006/0101413 | A1 | 5/2006 | Kinno et al. |
| 2007/0260849 | A1* | 11/2007 | Chen ..................... G06F 9/5044 712/34 |
| 2008/0010545 | A1* | 1/2008 | Tashiro ............... G06F 11/3616 714/39 |
| 2008/0276227 | A1 | 11/2008 | Greifeneder |
| 2009/0204851 | A1 | 8/2009 | Bengtsson et al. |
| 2010/0218171 | A1 | 8/2010 | Munson et al. |
| 2010/0318969 | A1 | 12/2010 | Petrovicky et al. |

FOREIGN PATENT DOCUMENTS

| | | |
|---|---|---|
| WO | WO-02077822 | 10/2002 |
| WO | WO-2011112467 A2 | 9/2011 |

OTHER PUBLICATIONS

Schmid et al. "Semi-Automatic Instrumentation of Critical Distributed Applications: The eMIVA Toolkit." Proc. of the 14th Annual Workshop of the HP Software University Association. Jul. 11 2007.*

Continuous Deployment Using TeamCity 6, MSDeploy, and Psake: http://trycatchfail.com/blog/post/Continuous-Deployment-Using-TeamCity-6-MSDeploy-and-psake.aspx, Jul. 2011.

Korean Intellectual Property Office, International Search Report and Written Opinion, Apr. 25, 2013, 11 pages, Daejeon Metropolitan City, Republic of Korea.

Make Continuous Deployment Practical and Cost-effective with Rational ALM Tools; http://www.ibm.com/developerworks/rational/library/continuous-deployment-rational-alm/index.html>, Feb. 21, 2012.

Humble, J., et al., Continous Delivery—Chapter 5 Anatomy of the Deployment Pipeline, In: Continous delivery—Chapter 5 Anatomy of the Deployment Pipeline, Aug. 1, 2010, 40 pages.

Supplementary European Search Report, European Patent Application No. 12884906.4, Mar. 23, 2016, 9 pages.

* cited by examiner

MONITOR USABLE WITH CONTINUOUS DEPLOYMENT

BACKGROUND

Software development life cycles use continuous integration (CI) and continuous deployment (CD) to reduce the time code changes spend in a production line. Continuous integration automates the process of receiving code changes from a specific source configuration management (SCM) tool, constructing deliverable assemblies with the code changes, and testing the assemblies.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

Figure 1:
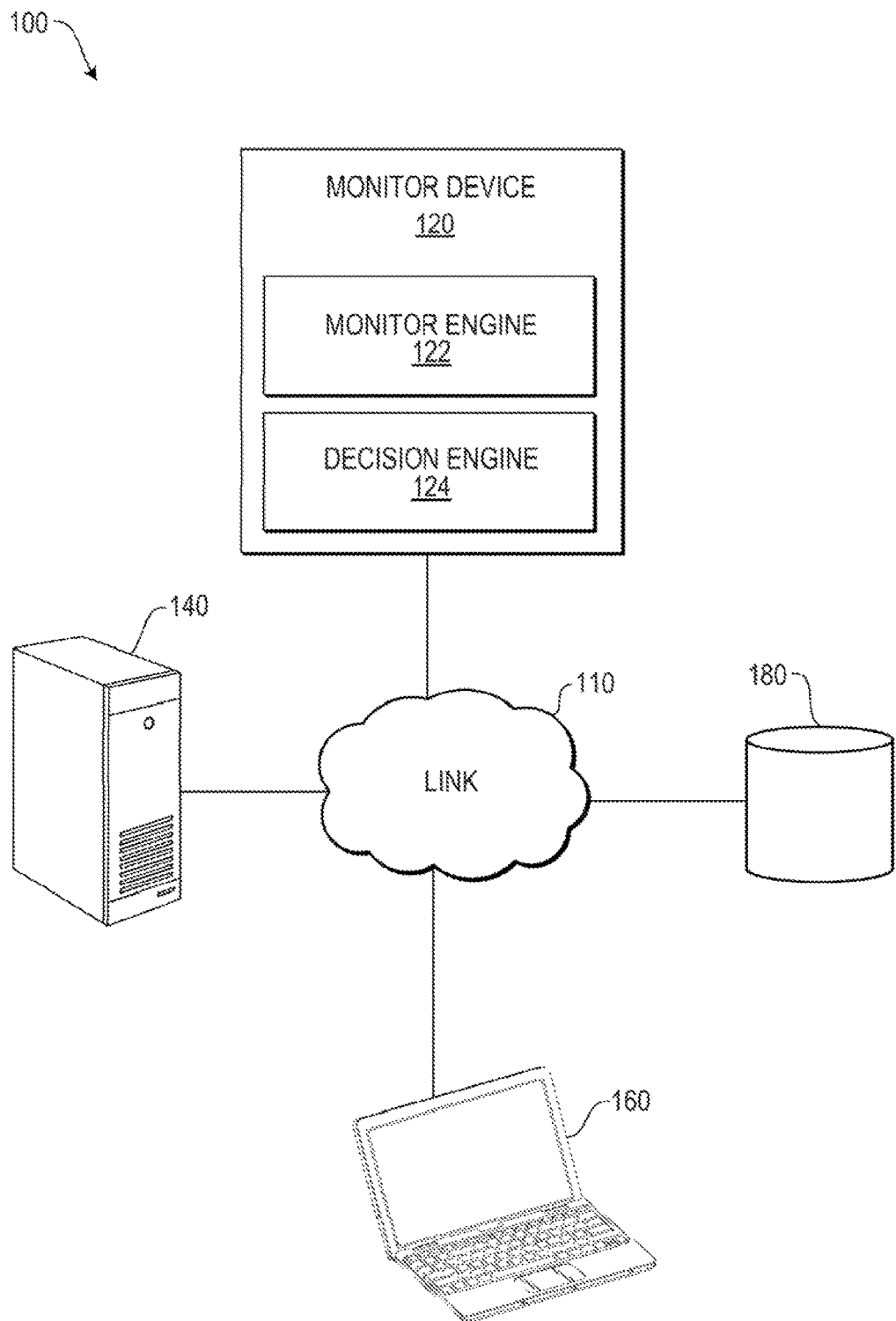
FIG. 1 illustrates a network environment to monitor an application deployed through a continuous deployment pipeline according to an example.

In the following detailed description, reference is made to the accompanying drawings which form a part hereof, and in which is illustrated by way of specific examples in which the present disclosure may be practiced. It is to be understood that other examples may be utilized and structural or logical changes may be made without departing from the scope of the present disclosure.

Continuous integration (CI) and continuous deployment (CD) automate the construction, testing, and deployment of code assemblies with a code change. Continuous integration automates the process of retrieving code changes from the SCM tool, constructing deliverable assemblies, such as executing a build and unit testing the assemblies. The automation begins after a code change is committed to a source configuration management (SCM) tool. When the code change is committed to the SCM tool, the code change is assigned to a particular continuous deployment pipeline (CD pipeline or deployment pipeline). The code change moves through the continuous deployment pipeline during testing as part of a code base or an assembly of code.

Continuous deployment extends continuous integration by automatically deploying assemblies into a test environment and executing testing on the assemblies. After the assemblies pass through the continuous deployment pipeline, the assemblies are deployed to production. In production, the assemblies are monitored, using for example, manually activating monitors at the time of deployment. Continuous deployment accelerates deployment of code changes and provides gradual or incremented integration of code changes "continuously," which require frequent monitoring. Manual activation of monitors may be ineffective and inaccurate as the monitor is not capable of being timely and accurately activated.

In examples, a monitor is provided. The monitor provides a monitor function that monitors an application. The monitor embeds the monitor function in meta data of a code base of the application. The monitor function embedded in the code base is activated. The monitor function is used to automatically monitor data associated therewith during deployment of the application. The monitor provides the monitor function, such as a regression monitor, at the time a specific code change is made during development, to automate the monitoring of data as the code base moves through deployment and into production.

The phrase continuous "deployment pipeline," "continuous deployment," or "deployment pipeline" refers to a set of actions executed serially and/or in parallel on a queue of code changes. For example, the continuous deployment pipeline includes building the code, executing unit tests, deploying the code, running automated tests, staging the code, running end-to-end tests, and deploying the code to production. Each continuous deployment pipeline is classified to receive code changes that match a defined set of criteria, for example, a specific continuous deployment pipeline is used for low risk and high priority code changes.

The phrase "during deployment" refers to processing of a code base from a code change commit through production, including testing in the continuous deployment pipeline and deployment to production.

The phrase "code base" refers to source code for a software application. Code assemblies are formed from the code base and include code changes.

The term "application" refers to a software application.

The phrase "monitor function" refers to functionality implemented in a computer readable medium or processor implemented method.

The phrase "monitor value" refers to meta data extracted from an application based on the monitor function.

FIG. 1 illustrates a network environment 100 according to an example. The network environment 100 includes a link 110 that connects a monitor device 120, a deployment device 140, a client device 160, and a data store 180. The monitor device 120 represents generally any computing device or combination of computing devices that monitor an application deployed through a continuous deployment pipeline. The monitor device 120 monitors an application deployed through a continuous deployment pipeline. The monitor device 120 includes a monitor engine 122 and a decision engine 124. The monitor engine 122 represents generally a combination of hardware, and/or programming that provide a monitor function to be executed during deployment of the application, i.e., testing and/or production. The decision engine 124 represents generally a combination of hardware and/or programming that activate the monitor function embedded in meta data of the code base and extracts data from the application during deployment, i.e., testing or production.

The deployment device 140 represents a computing device that receives the code changes and deploys code changes in the continuous deployment pipeline and to production. The client device 160 represents a computing device and/or a combination of computing devices configured to interact with the monitor device 120 and the deployment device 140 via the link 110. The interaction includes sending and/or transmitting data on behalf of a user, such as a code change to the code base and/or selecting a monitor function to embed in meta data of the code base during development of the application. The interaction also includes receiving data, such as a software application with a monitor function embedded therein as meta data. The client device 160 is, for example, a personal computing device which includes software that enables the user to create and/or edit code for a software application. The client device 160 may further include a user's computing device that runs the application for the user.

The data store 180 represents generally any memory configured to store data accessible by the monitor device 120, the deployment device 140, and/or the client device 160 in the performance of its function. The monitor device 120 functionalities are accomplished via the link 110 that connects the monitor device 120 to the deployment device 140, the client device 160, and the data store 180.

The link 110 represents generally one or more of a cable, wireless, fiber optic, or remote connections via a telecommunication link, an infrared link, a radio frequency link, or any other connectors or systems that provide electronic communication. The link 110 includes, at least in part, an intranet, the Internet, or a combination of both. The link 110 may also include intermediate proxies, routers, switches, load balancers, and the like.

Figure 2:
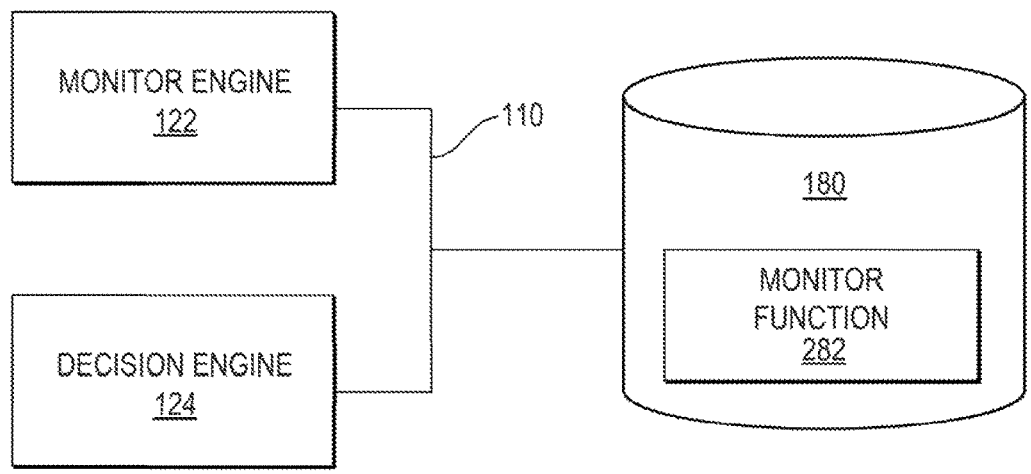
FIGS. 2-3 illustrate block diagrams of systems to monitor an application usable continuous deployment according to examples.

FIG. 2 illustrates a block diagram of a system 200 usable with continuous deployment according to examples. The system 200 includes a monitor engine 122, a decision engine 124, and a data store 180 connected by a link 110. The monitor engine 122 represents generally a combination of hardware and/or programming that provide a menu of a plurality of monitor functions 282 available for the application, i.e., monitor functions 282 compatible with the application.

For example, the monitor engine 122 receives a selection of the monitor function from a plurality of monitor functions. The selection is made in preproduction, such as when the code change is made and/or committed by the developer during the development of the application. The monitor function includes a function call and a function attribute associated with the function call. The function call includes, for example, a definition of a metric or event that is being monitored. The function attributes set parameters, such as thresholds and/or triggers for activation and/or alerts. The monitor engine 122 embeds the monitor function in meta data of a code base of the application. The meta data includes, for example, at least one of a code change, an identification of the person making the code change, a time stamp, and a date stamp.

The decision engine 124 represents generally a combination of hardware and/or programming that activates the selection of the at least one of the plurality of monitor functions 282 and extracts data from the application during deployment of an application, i.e., during testing and/or production. The monitor functions are automatically defined and activated during deployment. For example, the decision engine 124 automatically defines and activates the monitor function from a monitor resource. The monitor resource includes, for example, at least one of a monitoring tool, a plug-in to monitoring tools or platforms, and/or a database of executable instructions that monitor meta data. The decision engine 124 also automatically extracts data collected through the monitoring as defined by the monitor function.

The data store 180 stores data accessible by the monitor engine 122 and/or the decision engine 124. The data store 180 is for example, a database that stores a monitor function 282.

Figure 3:
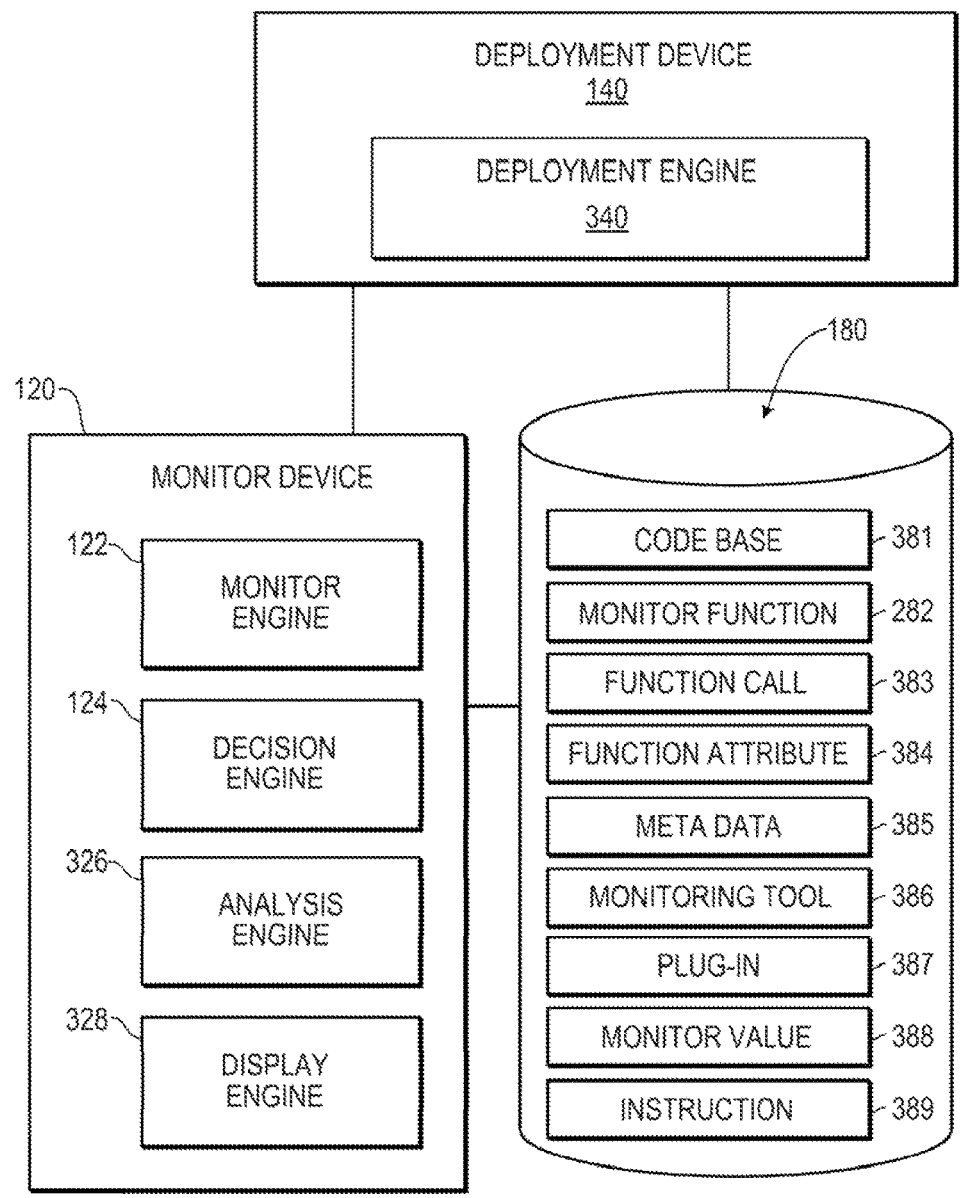

FIG. 3 illustrates a block diagram of a system 200 usable with the environment 100 of FIG. 1 according to a further example. The system 200 includes the monitor device 120, the deployment device 140, and the data store 180. As illustrated in FIG. 1, the monitor device 120, the deployment device 140, and the data store 180 are connected via the link 110.

The monitor device 120 monitors an application deployed through a continuous deployment pipeline. The monitor device 120 is connected to the deployment device 140, which runs the application and receives the code base 381 changes from the client device 160 (illustrated in FIG. 1). The monitor device 120 is illustrated as including a monitor engine 122 and a decision engine 124.

The monitor engine 122 represents generally a combination of hardware and/or programming that provide a menu of a plurality of monitor functions 282 available for the application, i.e., monitor functions 282 compatible with the application. The compatibility is determined during development, such that the monitoring functions 282 are provided during development of the application. The monitor engine 122 receives a selection of at least one of the plurality of monitor functions 282. The selection is also typically received during development, which enables the developer to select the monitor function 282 as the code base 381 is being developed and/or code changes are being entered. Each monitor function 282 includes, for example, a function call 383 and a function attribute 384 associated with the function call 383. The monitor engine 122 embeds the selection of the at least one of the plurality of monitor functions 282 in meta data 385 of a code base 381 of the application prior to deployment of the code base to the deployment pipeline and/or production. For example, the meta data 385 includes at least one of a code change, an identification of the person making the code change, a time stamp, and a date stamp. The monitor engine 122 also automatically receives an instruction 389 and/or data, such as meta data 385, from the decision engine 124 and/or the data store 180 in accordance with the monitor function 282.

The decision engine 124 represents generally a combination of hardware and/or programming that activates the selection of the at least one of the plurality of monitor functions 282 and extracts data from the application during deployment, i.e., during testing and/or production. Data, such as meta data 385, is automatically extracted from the application during deployment. For example, the data is extracted as the deployment engine executes the monitoring function 282 selected. The decision engine 124 determines the specific one(s) of the plurality of monitor functions 282 to provide via the monitor engine 122. The monitor function 282 is embedded in the meta data 385 of the code base 381 during deployment of the application is defined by the decision engine 124. For example, the decision engine 124 defines the monitor function 282 from a monitor resource. The monitor resource includes, for example, at least one of a monitoring tool 386, a plug-in 387, and/or a database of executable instructions 389 that monitor meta data 385.

The decision engine 124 and/or a separate analysis engine 326 analyzes the monitor values 388. For example, the monitor functions 282 are determined from meta data 385. The meta data 385 received from the application during deployment is analyzed and a monitor report is generated to identify monitor values 388 for diagnosis, history, and/or reporting purposes.

The monitor device 120 further includes a display engine 328 to display at least one of a menu or list that includes the monitor function 282, i.e., the monitor functions available for selection. The display engine 328 also displays a representation of data extracted from the application with the monitor function 282. The display is provided via a display, such as a graphical user interface (GUI) associated with the monitor device 120 and/or via a client device 160 connected to the monitor device 120.

The deployment device 140 includes a deployment engine 340. The deployment engine 340 represents generally a combination of hardware and/or programming that deploys a code base 381 after the code base 381 successfully completes a set of tests in a test environment. The deployment device 140 deploys the code base 381 via a deployment engine 340. The deployment engine 340 works together with the monitor engine 122 and the decision engine 124 to monitor the application. For example, the deployment device 140 executes the at least one of the plurality of monitor functions 282 selected using the deployment engine 340.

The data store 180 stores data accessible by the monitor device 120 and/or the deployment device 140. The data store 180 is, for example, a database that stores at least one of the following a code base 381, a monitor function 282, such as a function call 383 and a function attribute 384. The data store 180 also stores meta data 385, a monitoring tool 386, a plug-in 387 to monitoring tools 386 or platforms, a monitoring value 388, and an instruction 389, such as an instruction to be performed by a processor 412 and/or database of executable instructions that monitor meta data 385.

Figure 4:
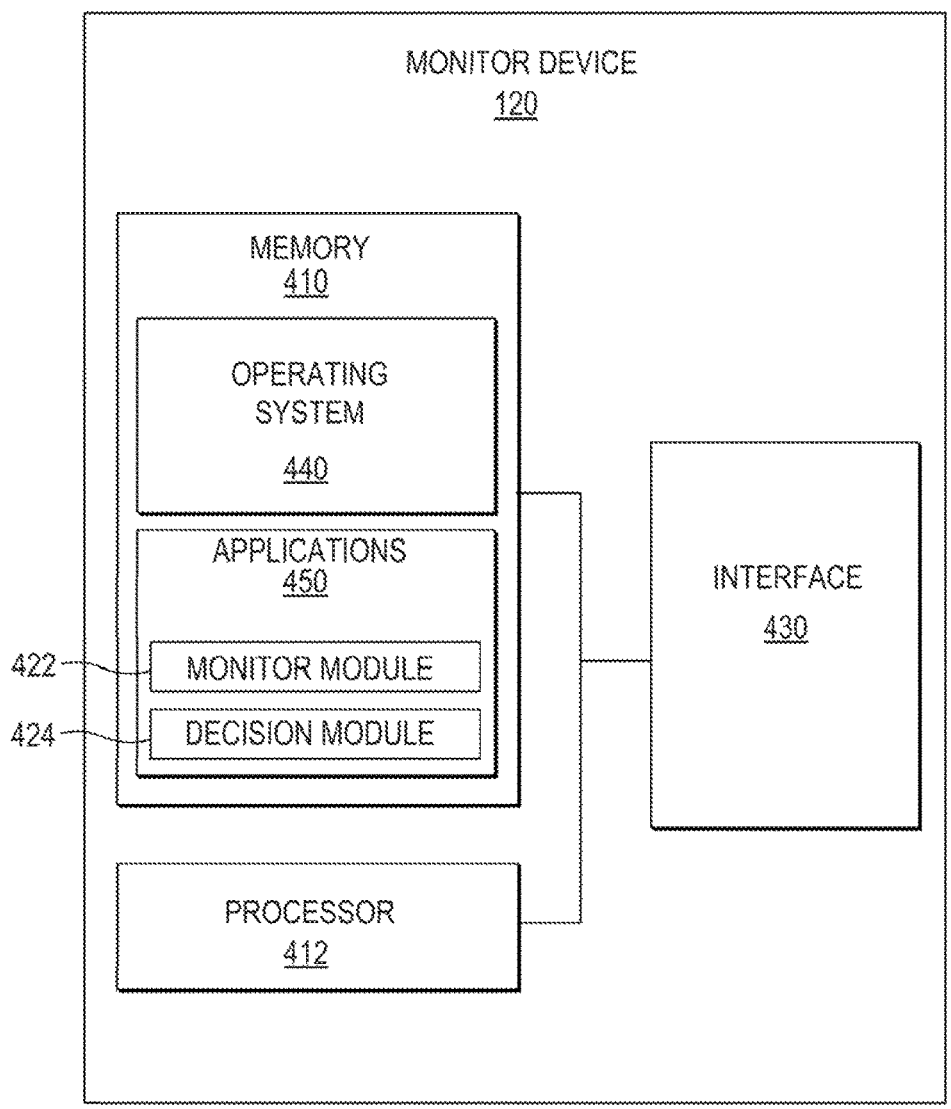
FIG. 4 illustrates a block diagram of a computer readable medium that monitors an application, according to an example.

FIG. 4 illustrates a block diagram of a computer readable medium 400 that monitors an application through a continuous deployment pipeline according to an example. In FIG. 4, the monitor device 120 is illustrated to include a memory 410, a processor 412, and an interface 430. The memory 410 stores a set of instructions. The processor 412 is coupled to the memory 410 to execute the set of instructions. The processor 412 represents generally any processor configured to execute program instructions 389 stored in memory 410 to perform various specified functions. The interface 430 represents generally any interface enabling the monitor device 120 to communicate with the deployment device 140 via the link 110, as illustrated in FIGS. 1 and 3.

The memory 410 is illustrated to include an operating system 440 and applications 450. The operating system 440 represents a collection of programs that when executed by the processor 412 serves as a platform on which applications 450 run. Examples of operating systems 440 include venous versions of Microsoft's Windows® and Linux®. Applications 450 represent program instructions that when executed by the processor 412 function as an application that when executed by a processor 412 monitor an application through a continuous deployment pipeline.

For example, FIG. 4 illustrates a monitor module 422 and a decision module 424 as executable program instructions 389 stored in memory 410 of the monitor device 120. The monitor module 422, when executed provides a monitor function 282 to be executed during deployment of an application. For example, the set of instructions provide a monitor function that monitor an application and embed the monitor function in meta data of a code base of the application. The meta data includes at least one of a code change, an identification of the person making the code change, a time stamp, and a date stamp. The monitor function is selected from, for example, a plurality of monitor functions. The monitor function may be selected from a list or menu of monitoring functions that are provide based on a determination of compatibility with the application. The monitor function is selected during development of the application and/or prior to deployment, i.e., in preproduction as the code changes are incorporated into the code base. The monitor function includes a function call and a function attribute associated with the function call.

The decision module 424, when executed activates the monitor function 282 embedded in the code base 381, and extracts data from the application during deployment. For example, the set of instructions activate the monitor function embedded in meta data of the code base. The monitor function is from a monitor resource, such as a monitoring tool, a plug-in to monitoring tools or platforms, and/or a database of executable instructions that monitor meta data. The set of instructions also monitor data associated with the monitor function. For example, data is automatically extracted from the application during deployment, i.e. during testing and/or production.

Referring back to FIGS. 1-3, the monitor engine 122 and the decision engine 124 of the monitor device 120 are described as combinations of hardware and/or programming. As illustrated in FIG. 4, the hardware portions include the processor 412. The programming portions include the operating system 440, applications 450, and/or combinations thereof. For example, the monitor module 422 represents program instructions 389 that when executed by a processor 412 cause the implementation of the of the monitor engine 122 of FIGS. 1 and 3. The decision module 424 represents program instructions 389 that when executed by a processor 412 cause the implementation of the of the decision engine 124 of FIGS. 1 and 3. Similarly, the functions of the analysis engine 326 and the display engine 328 are performed by the monitor module 422 and/or the decision module 424 or by additional module(s) (not shown).

The programming of the monitor module 422 and decision module 424 may be processor 412 executable instructions 389 stored on a memory 410 that includes a tangible memory media and the hardware include a processor 412 to execute the instructions, e.g., instruction 389. The memory 410 may store program instructions 389 that when executed by the processor 412 cause the processor 412 to perform the program instructions 389. The memory 410 is integrated in the same device as the processor 412 or it is separate but accessible to that device and processor 412.

In some examples, the program instructions 389 may be part of an installation package that can be executed by the processor 412 to perform a method using the system 200. The memory 410 is a portable medium such as a CD, DVD, or flash drive or a memory maintained by a server from which the installation package can be downloaded and installed. In some examples, the program instructions 389 may be part of an application or applications already installed on the server. In further examples, the memory 410 includes integrated memory, such as a hard drive.

Figure 5:
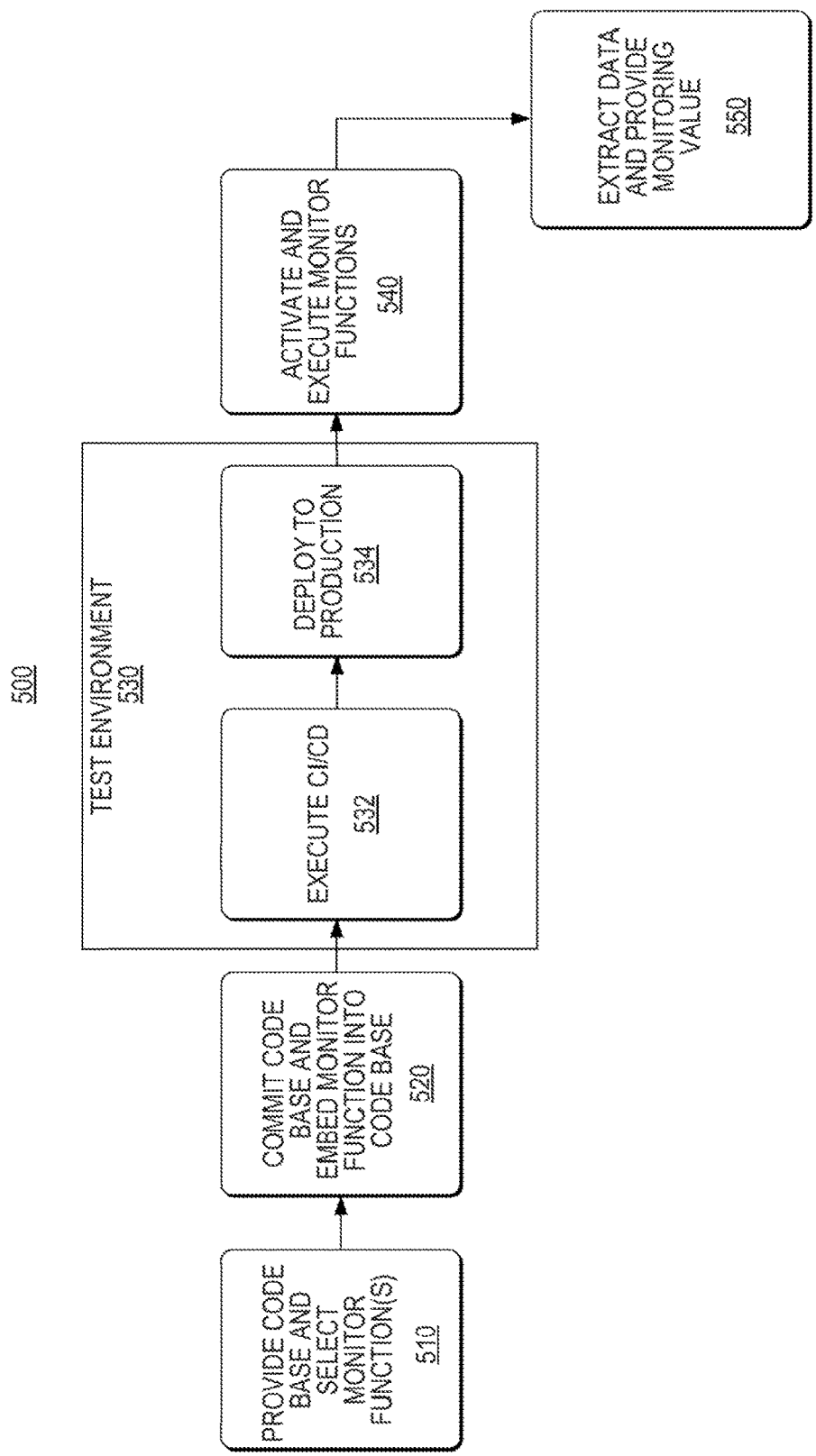
FIG. 5 illustrates a flow chart of a process to monitor an application according to an example.

FIG. 5 illustrates a flow chart 500 of the process to monitor an application according to an example. Referring to FIG. 5, the code base is provided and monitoring functions are selected in block 510. The code base includes code changes entered by a developer. The developer has the ability to select the monitoring functions at the time the code changes are made.

For example, the developer may be working in an integrated development environment or command line, which enables the developer to select and set monitor functions for each of the specific code change in the process of being made. The monitor functions are selected from for example, menus or lists. Once the monitor function is selected, the developer sets function attributes, i.e. parameters, based on expectations of the change, such as a monitor trigger, duration of the monitor, thresholds, notifications, and/or exceptions. The monitor function, for example, runs during specific stages in a deployment pipeline, such as only during staging or based on other temporal events, such as five minutes before deployment to testing or deployment to production.

In block 520, the code base is committed via, for example an SCM tool or an integration. The code changes are identified, as committed and the monitoring function(s) selected are embedded in meta data of the code base.

Block 530 illustrates the test environment that deploys the code changes integrated into the code base into various environments, such as testing staging, and production. The CI/CD process (via the continuous deployment pipeline) is executed on an assembly of the code base in the test environment in block 532. Once the assembly of the code base passes the tests, the assembly with the code base is deployed to production in block 534.

The monitor functions are automatically activated and executed in block 540. The activation of the monitor functions enables data requested in the function call and the function attributes to be obtained, such as the actual time of deployment, the environment, risk, cost, performance, and/or exposure level. Data is extracted and the monitor value is provided in block 550. The data extracted and the monitor value provided may be used to monitor performance, such as regression of the application due to the code change.

For example, the monitoring automatically collects and extracts data based on the monitor functions embedded in meta data of the code base. This enables the monitor functions to be added during development instead of testing or production, which provides more efficient and accurate monitoring. Moreover, because the monitor functions are automatically activated and executed and data is automatically extracted, the developer monitoring the application does not need to be present throughout the entire deployment process, but instead is notified of monitoring values or other data.

Figure 6:
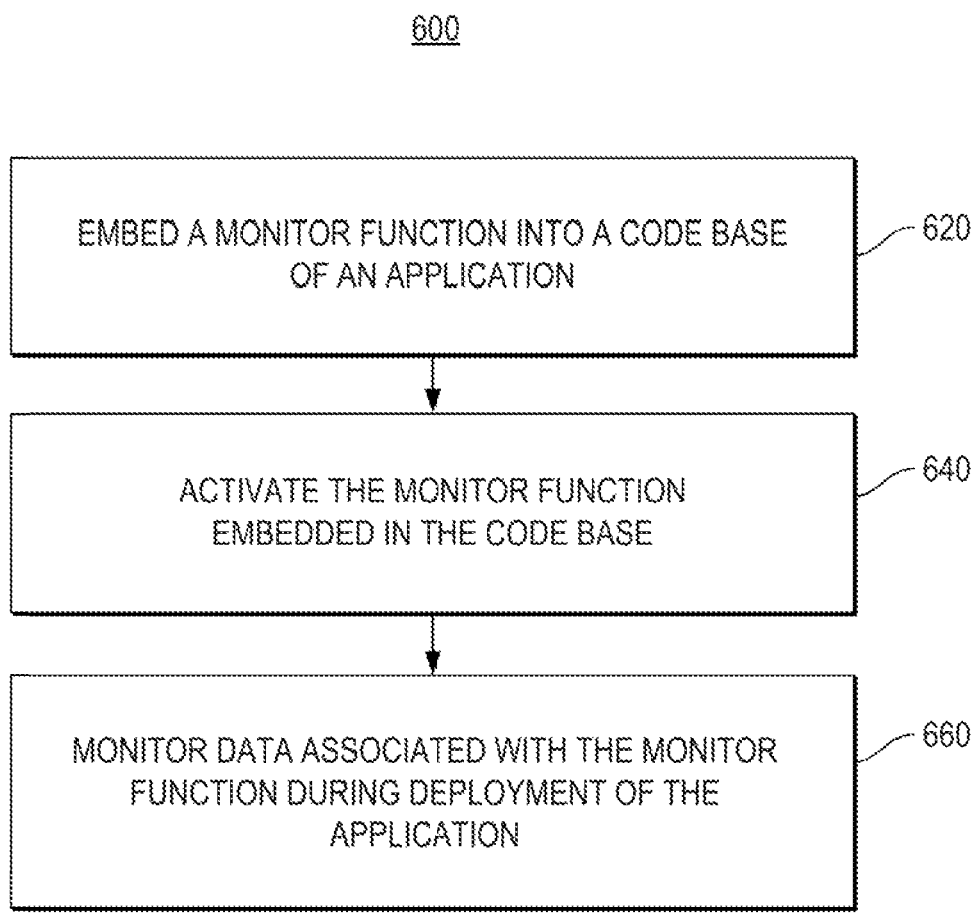
FIG. 6 illustrates a flow chart of a method to monitor an application usable with continuous deployment according to an example.

FIG. 6 illustrates a flow diagram 600 of a method, such as a processor implemented method, to monitor an application. The method is usable with an apparatus, including a monitor engine and a decision engine, usable with continuous deployment. In block 620, the method embeds a monitor function in meta data of a code base of the application. The monitor function includes a function call and a function attribute associated with the function call. The monitor engine embeds the monitor function in meta data of a code base of the application. For example, the meta data includes at least one of a code change, an identification of the person making the code change, a time stamp, and a date stamp.

The monitor function embedded in meta data of the code base is activated in block 640. For example, the monitor function is automatically defined and activated by a monitor resource. The monitor resource includes, for example, at least one of a monitoring tool, a plug-in to monitoring tools or platforms, and/or a database of executable instructions that monitor meta data.

In block 660, data associated with the monitor function are monitored during deployment of the application. The monitoring includes automatically extracting data collected as defined by the monitor function.

FIGS. 1-6 aid in illustrating the architecture, functionality, and operation according to examples. The examples illustrate various physical and logical components. The various components illustrated are defined at least in part as programs, programming, or program instructions. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Examples can be realized in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagram of FIG. 6 illustrates specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art Therefore, the scope of the present disclosure is limited only by the elements and limitations as used in the claims.

What is claimed is:

1. A non-transitory computer readable medium having instructions that when executed by a processor monitor an application through a continuous deployment pipeline, the instructions comprising:

a monitor module to, when executed:
  receive a selection from a user of a monitor function;
  embed the selection of the monitor function in meta data of a code base of the application, the monitor function includes functional attributes set in the code base; and
a decision module to, when executed:
  automatically define and activate the monitor function embedded in meta data of a code base during a deployment of the application in the continuous deployment pipeline, wherein the meta data includes an identification of the person making a code change, a time stamp, or a data stamp, and
  extract data from the application during the deployment.

2. The non-transitory computer readable medium of claim 1, wherein the monitor module receives a selection of the monitor function from a plurality of monitor functions.

3. The non-transitory computer readable medium of claim 1, wherein the monitor function includes a function call and a function attribute associated with the function call.

4. The non-transitory computer readable medium of claim 1, wherein the decision module defines the monitor function from a monitor resource.

5. The non-transitory computer readable medium of claim 4, wherein the monitor resource comprises a monitoring tool, a plug-in, or a database of executable instructions that monitor meta data.

6. A system to monitor an application deployed through a continuous deployment pipeline, the system comprising:
  a monitor engine including a physical processor to:
    provide a menu to a user of a plurality of monitor functions available for the application;
    receive a selection from the user of at least one of the plurality of monitor functions;
    embed the selection of the at least one of the plurality of monitor functions in meta data of a code base of the application, the monitor functions includes functional attributes set in the code base; and
  a decision engine including a physical processor to:
    automatically define and activate the selection of the at least one of the plurality of monitor functions during a deployment of the application in the continuous deployment pipeline, wherein the meta data includes an identification of the person making a code change, a time stamp, or a date stamp, and
    extract data from the application during the deployment, as a deployment engine executes the at least one of the plurality of monitor functions selected.

7. The system of claim 6, wherein the decision engine determines the plurality of monitor functions to provide.

8. The system of claim 6, wherein data extracted from the application during deployment comprises meta data.

9. The system of claim 6, further comprising a data store to store the plurality of monitor functions, the plurality of monitor functions include a monitoring tool, a plug-in, or a database of executable instructions that monitor meta data.

10. The system of claim 6, further comprising a display engine to display:
  a menu that includes the plurality of monitor functions; or
  a representation of data extracted from the application with the at least one of the plurality of monitor functions.

11. The system of claim 6, further comprising an analysis engine to:
  determine the at least one of the plurality of monitor functions from meta data;
  analyze meta data received from the application during deployment; or
  generate a monitor report to identify a monitor value.

12. An apparatus that monitors an application, the apparatus comprising:
  a memory to store a set of instructions; and
  a processor coupled to the memory to execute the set of instructions to:
    receive a selection from a of a monitor function;
    embed the monitor function in meta data of a code base of the application, the monitor function includes functional attributes set in the code base;
    automatically define and activate the monitor function embedded in the code base during a deployment of the application in a continuous deployment pipeline, wherein the meta data includes an identification of the person making a code change, a time stamp, or a date stamp; and
    extract data associated with the monitor function during the deployment of the application in the continuous deployment pipeline.

13. The apparatus of claim 12 further comprising an analysis engine to:
  determine the monitor function from the meta data;
  analyze the meta data received from the application during the deployment; or
  generate a monitor report to identify a monitor value.

14. The apparatus of claim 12 further comprising a display engine to display:
  a menu that includes a plurality of monitor functions including the monitor function; or
  a representation of data extracted from the application with the monitor function.

15. The apparatus of claim 14 wherein the menu allows for a selection of the monitor function from the plurality of monitor functions and the selection is made in preproduction when a code change is made or committed by a developer.

16. The apparatus of claim 14 further comprising a data store to store the plurality of monitor functions, the plurality of monitor functions include a monitoring tool, a plug-in, or a database of executable instructions that monitor meta data.

* * * * *